(12) United States Patent
Valldeperas et al.

(10) Patent No.: US 11,673,989 B2
(45) Date of Patent: Jun. 13, 2023

(54) CHEMICAL AND STAIN RESISTANT THERMOPLASTIC POLYURETHANE COMPOSITION

(71) Applicant: Lubrizol Advanced Materials, Inc., Cleveland, OH (US)

(72) Inventors: Jacob Gil Valldeperas, Barcelona (ES); Romina Marin Bernabe, Terrassa (ES); Umit G. Makal, Stow, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 326 days.

(21) Appl. No.: 16/769,343

(22) PCT Filed: Nov. 13, 2018

(86) PCT No.: PCT/US2018/060604
§ 371 (c)(1),
(2) Date: Jun. 3, 2020

(87) PCT Pub. No.: WO2019/112757
PCT Pub. Date: Jun. 13, 2019

(65) Prior Publication Data
US 2020/0325269 A1    Oct. 15, 2020

Related U.S. Application Data

(60) Provisional application No. 62/595,619, filed on Dec. 7, 2017.

(51) Int. Cl.
*C08G 18/42* (2006.01)
*C08G 18/32* (2006.01)
*C08G 18/48* (2006.01)
*C08G 18/66* (2006.01)
*C08G 18/73* (2006.01)
*C08L 75/04* (2006.01)
*C08J 5/18* (2006.01)

(52) U.S. Cl.
CPC ..... *C08G 18/4277* (2013.01); *C08G 18/3218* (2013.01); *C08G 18/4238* (2013.01); *C08G 18/4854* (2013.01); *C08G 18/664* (2013.01); *C08G 18/6674* (2013.01); *C08G 18/73* (2013.01); *C08L 75/04* (2013.01)

(58) Field of Classification Search
None
See application file for complete search history.

(56) References Cited

U.S. PATENT DOCUMENTS

| | | | |
|---|---|---|---|
| 2,945,008 A | | 7/1960 | Caldwell et al. |
| 2003/0092832 A1 | * | 5/2003 | Tanaka .......... C09D 175/04 524/589 |
| 2017/0226265 A1 | | 8/2017 | Makal |
| 2018/0258283 A1 | * | 9/2018 | Bernabe .......... C08L 75/04 |

FOREIGN PATENT DOCUMENTS

| | | | | |
|---|---|---|---|---|
| WO | 2016105886 A1 | | 6/2016 | |
| WO | WO-2016105886 A1 | * | 6/2016 | ......... C08G 18/3218 |

* cited by examiner

*Primary Examiner* — Randy P Gulakowski
*Assistant Examiner* — Ha S Nguyen
(74) *Attorney, Agent, or Firm* — Eryn Ace Fuhrer; Michael A. Miller

(57) ABSTRACT

The present invention relates to novel thermoplastic polyurethane compositions made from the reaction product of an isocyanate component comprising hexamethylene-1,6-diisocyanate, a polyol component, and a chain extender component comprising an alkylene substituted spirocyclic compound. The present invention provides for thermoplastic polyurethane compositions which is resistant to chemical degradation and stains.

27 Claims, No Drawings

CHEMICAL AND STAIN RESISTANT THERMOPLASTIC POLYURETHANE COMPOSITION

CROSS REFERENCE TO RELATED APPLICATION

This application claims priority from PCT Application Serial No. PCT/US2018/60604 filed on Nov. 13, 2018, which claims the benefit of U.S. Provisional Application No. 62/595,619 filed on Dec. 7, 2017, the entirety of all three which is hereby incorporated by reference.

FIELD OF THE INVENTION

The present invention relates to thermoplastic polyurethane compositions which can be used in articles where chemical and stain resistance resistance as well as transparency are desirable.

BACKGROUND OF THE INVENTION

It is often desirable for articles made using thermoplastic polyurethanes to be resistant to chemical degredation and staining. This can be especially challenging for articles or materials that are also transparent. Therefore, it is desirable to have thermoplastic polyurethane compositions that are resistant to chemical degredation and staining. In addition, in some embodiments, it would be desirable for the thermoplastic polyurethane composition to also be transparent.

SUMMARY OF THE INVENTION

The present invention provides a thermoplastic polyurethane composition which comprises the reaction product of (1) a polyisocyanate component, wherein the polyisocyanate component comprises hexamethylene-1,6-diisocyanate, (2) a polyol component, and (3) a chain extender component, wherein the chain extender component comprises an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In one embodiment, the polyol component may be a polyether polyol. In another embodiment, the polyol component may be a polyester polyol.

In one embodiment, the present invention provides a thermoplastic polyurethane composition which comprises the reaction product of (1) a polyisocyanate component, wherein the polyisocyanate component comprises at least 90 mol % hexamethylene-1,6-diisocyanate, (2) a polyol component, and (3) a chain extender component, wherein the chain extender component comprises at least 90 mol % of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In one embodiment, the polyol component may be a polyether polyol. In another embodiment, the polyol component may be a polyester polyol. In another embodiment, the polyol may be selected from poly(tetramethylene ether) glycol, polycaprolactone polyol, or polyethylene butylene adipate, or combinations thereof.

The present invention further provides articles made from any of the thermoplastic polyurethane compositions described herein.

The invention also provides a method of increasing the chemical and stain resistance of an article by making the article using the thermoplastic polyurethane compositions described herein. In particular, any thermoplastic polyurethane composition described above may be used in this method.

DETAILED DESCRIPTION OF THE INVENTION

The thermoplastic polyurethane composition (TPU) of this invention includes the reaction product of (1) an polyisocyanate component, comprising at least 90 mol % of hexamethylene-1,6-diisocyanate, (2) a polyol component, and (3) a chain extender component comprising at least 90 mol % of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. The technique under which these reactants are polymerized to synthesize the TPU may be conducted utilizing conventional processing equipment, catalysts, and processes. The polymerization may be conducted in a manner that will result in the desired polymer characteristics or properties. The polymerization techniques useful in making the TPUs of this invention include conventional methods, such as reactive extrusion, batch processing, solution polymerization, and cast polymerization.

The Polyisocyanate Component

The thermoplastic polyurethane composition of the present invention includes a polyisocyanate component. Isocyanates commonly used to make thermoplastic polyurethane compositions include aliphatic and aromatic diisocyanates. Aliphatic diisocyanates include hexamethylene-1,6-diisocyanate (HDI), isophorone diisocyanate (IPDI), 1,4-cyclohexyl diisocyanate (CHDI), decane-1,10-diisocyanate, lysine diisocyanate (LDI), 1,4-butane diisocyanate (BDI), 1,4-bis(isocyantomethyl) cyclohexane (1,4-H6XDI), and dicyclohexylmethane-4,4'-diisocyanate (H12MDI). Aromatic diisocyanates include 4,4'-methylenebis(phenyl isocyanate) (MDI), m-xylylene diisocyanate (XDI), phenylene-1,4-diisocyanate, naphthalene-1,5-diisocyanate (NDI), diphenylmethane-3,3'-dimethoxy-4,4'-diisocyanate, or toluene diisocyanate (TDI). Dimers and trimers of the above diisocyanates as well as a blend of two or more diisocyanates may be used to prepare thermoplastic polyurethanes.

In one embodiment of the invention, the polyisocyanate component comprises hexamethylene-1,6-diisocyanate and contains less than 10 mol %, or even less than 5 mol % of isocyanates other than hexamethylene-1,6-diisocyanate. In some embodiments, the polyisocyanate component is substantially free of isocyanates other than hexamethylene-1,6-diisocyanate, such that the polyisocyanate component consists of hexamethylene-1,6-diisocyanate.

The Polyol Component

The thermoplastic polyurethane composition of the present invention comprises a polyol component. The polyol component may include polyether or polyester polyols.

In one embodiment, the polyol component includes a polyether polyol. Polyether polyols are generally derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene) glycol (PEG) comprising ethylene oxide reacted with ethylene glycol, poly(propylene) glycol comprising propylene oxide reacted with propylene glycol, poly(tetramethylene ether) glycol comprising water reacted with tetrahydrofuran which can also be described as polymerized tetrahydrofuran, and which is commonly referred to as PTMEG or poly(tetramethylene ether) glycol. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. In one embodiment of the present invention, the polyol component is a polyether polyol, wherein the polyether polyol comprises, consists essentially of, or consists of PTMEG.

In another embodiment, the polyol component may be a polyester polyol. Polyester polyols may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

In some embodiments, dimer fatty acids may be used to prepare polyester polyols that may be used in making the TPU compositions useful in the present invention. Examples of dimer fatty acids that may be used to prepare polyester polyols include Priplast™ polyester glycols/polyols commercially available from Croda and Radia® polyester glycols commercially available from Oleon.

The polyol component of the TPU compositions may also comprise one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, monoethylene glycol, 1,6-hexanediol, 2,2-dimethyl-1,3-propanediol, or any combination thereof or any glycols and/or diols known to those skilled in the art. In some embodiments, the polycaprolactone polyester polyols are linear polyester diols derived from caprolactone monomers. Examples of commercially available polycaprolactone polyols include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

In one embodiment of the present invention the polyol component is a polyester polyol which comprises, consists essentially of, or consists of polycaprolactone polyol. In another embodiment of the present invention the polyol component is a polyester polyol which comprises, consists essentially of, or consists of polyethylene butylene adipate.

In some embodiments, the polyol component may be a polyether or polyester as described above, but may also comprise a copolymeric polyether polyol or mixtures of polyether polyols and/or copolymeric polyether polyols. In one embodiment, the copolymeric polyether polyol is a copolymer of polyether polyol and a polyol selected from polyester polyol, polycarbonate polyol, polycaprolactone polyol or polyamide polyol.

The Chain Extender Component

The chain extender component of the present invention comprises an alkylene substituted spirocyclic compound which comprises an alkylene substituted saturated spirocyclic-diol, an alkylene substituted saturated spirocyclic-diamine, or a combination thereof and each ring is substituted with an alkylene group that contains from 1 to 4 carbon atoms, terminated by a hydroxy group or an amine where the amine is a primary or secondary amine. In one embodiment, the alkylene substituted spirocyclic compound is a spiroheterocycle containing 2 heteroatoms in each ring, and the heteroatoms are oxygen, nitrogen, sulfur or phosphorous. In one embodiment, the alkylene substituted spirocyclic compound is a spiroheterocycle containing 2 heteroatoms in each ring and the heteroatoms are oxygen or nitrogen. In one embodiment, the alkylene substituted spirocyclic compound is a spiroheterocycle containing 2 heteroatoms in each ring and the heteroatoms are oxygen.

In one embodiment, the alkylene substituted spirocyclic compound has a structural formula:

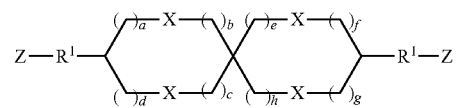

wherein each X is independently selected from O, CHR², NR², S, PR², wherein each R² represents a hydrogen atom or an alkyl group containing from 1 to about 6 carbon atoms, each $R^1$ is an alkylene containing from 1 to 4 carbon atoms, which may be linear or branched, and each Z is selected from —OH or —NHR$^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3. In one embodiment, a is equal to g, b is equal to h, c is equal to e and d is equal to f. In one embodiment, all X are identical. In one embodiment, all X are identically selected from O or NR$^2$, wherein R$^2$ represents a hydrogen atom or an alkyl group containing from 1 to about 6 carbon atoms, a is equal to g, b is equal to h, c is equal to e and d is equal to f. In one embodiment, the spirocyclic-dialkylene compound contains two 6-membered ring, X is independently selected from O or NR$^2$, wherein R$^2$ represents a hydrogen atom or an alkyl group containing from 1 to about 6 carbon atoms, $R^1$ is an alkylene containing from 1 to 4 carbon atoms, Z is —OH or NH$_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is identically selected from 0 or NR$^2$, wherein R$^2$ represents a hydrogen atom or an alkyl group containing from 1 to about 6 carbon atoms, $R^1$ is an alkylene containing from 1 to 4 carbon atoms, Z is —OH or NH$_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is O, $R^1$ is 1,1-dimethylethyl, Z is —OH, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

In one embodiment, the alkylene substituted spirocyclic compound shows a structural formula:

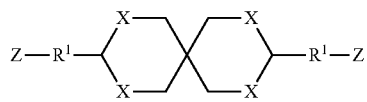

wherein each X is independently selected from O, CHR$^2$, NR$^2$, S, PR$^2$, wherein each R$^2$ represents a hydrogen atom or an alkyl group containing from 1 to about 6 carbon atoms, each $R^1$ is an alkylene containing from 1 to 4 carbon atoms, which may be linear or branched, and each Z is selected from —OH or wherein R$^3$ represents a hydrogen atom or an alkyl group containing from 1 to about 6 carbon atoms. In one embodiment, X is identically selected from 0, CHR$^2$, NR$^2$, S, PR$^2$, wherein each R$^2$ represents a hydrogen atom or an alkyl group containing from 1 to about 6 carbon atoms. In one embodiment, X is O, $R^1$ is 1,1-dimethylethyl, and Z is —OH.

In one embodiment, the chain extender component comprises an alkylene substituted spirocyclic compound as described herein and contains less than 10 mol % of a co-chain extender other than the alkylene substituted spirocyclic compound. Co-chain extenders may include aliphatic or cycloaliphatic diamines or glycols having from 2 to 20, or 2 to 12, or 2 to 10 carbon atoms, or combinations thereof. Examples of co-chain extenders include ethylene glycol, diethylene glycol, propylene glycol, dipropylene glycol, 1,3-propanediol, 1,4-butanediol (BDO), 1,6-hexanediol (HDO), 1,3-butanediol, 1,5-pentanediol, neopentylglycol, 1,4-cyclohexanedimethanol (CHDM), hexamethylenediol, heptanediol, nonanediol, dodecanediol, 2-ethyl-1,3-hexane- diol, 2,2,4-trimethyl pentane-1,3-diol, 1,4-cyclohexanedimethylol, 3-methyl-1,5-pentanediol, ethylenediamine, butanediamine, hexamethylenediamine, 2-butyl-2-ethyl-1,3-propanediol, and the like, as well as mixtures thereof. In one embodiment, the chain extender component is substantially free of co-chain extenders other than the alkylene substituted spirocyclic compound such that the chain extender component consists of the alkylene substituted spirocyclic compound.

The isocyanate component and the chain extender component of a TPU composition are often referred to as the "hard segment" of the TPU. In one embodiment of the present invention, the TPU composition contains greater than 50% by weight, or even at least 55% by weight, or even at least 60% by weight hard segment. The TPU compositions made in accordance with the present invention may have a Shore D hardness of 40 D to 85 D, for example 50 D to 80 D. In one embodiment, the TPU comprises the reaction product of 25% to 30% by weight polyisocyanate component comprising, consisting essentially of, or consisting of hexamethylene-1,6-diisocyanate, 20% to 40% by weight polyether polyol, and 30% to 45% by weight chain extender component comprising, consisting essentially of, or consisting of alkylene substituted spirocyclic compound comprising an alkylene substituted saturated spirocyclic-diol, an alkylene substituted saturated spirocyclic-diamine, or a combination thereof.

In one embodiment, the present invention provides a thermoplastic polyurethane composition which comprises the reaction product of (1) a polyisocyanate component, wherein the polyisocyanate component comprises at least 90 mol % hexamethylene-1,6-diisocyanate, (2) a polyol component, and (3) a chain extender component, wherein the chain extender component comprises at least 90 mol % of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In one embodiment, the polyol component may be a polyether polyol. In another embodiment, the polyol component may be a polyester polyol. In still another embodiment, the polyol may be selected from poly(tetramethylene ether) glycol, polycaprolactone polyol, or polyethylene butylene adipate, or combinations thereof.

In one embodiment, the present invention provides a thermoplastic polyurethane composition which comprises the reaction product of (1) a polyisocyanate component, wherein the polyisocyanate component consists of hexamethylene-1,6-diisocyanate, (2) a polyol component, and (3) a chain extender component, wherein the chain extender component consists of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine, and wherein the chain extender component contains less than 10 mol % of a co-chain extender other than the alkylene substituted spirocyclic compound. In this embodiment, the polyol component may comprise, consist essentially of, or consist of poly(tetramethylene ether) glycol, polycaprolactone polyol, or polyethylene butylene adipate, or combinations thereof.

In one embodiment, the TPU composition of the present invention exhibits resistance to permanent marker staining according to ASTM D6578M-13 by showing a ΔE of less than 35 or even less than 31, or even 17 or less. In one embodiment, the TPU composition is transparent, that is, it has a Haze as measured according to ASTM D1003-11 of less than 20 or 15 or less. In one embodiment, the TPU composition of the present invention also exhibits an average Chemical Resistance according to END 438-2 of at least 4.5, or even 5 (visual rating).

In another aspect, the present invention further discloses a process of making the TPU composition described herein, comprising reacting (1) an polyisocyanate component comprising hexamethylene-1,6-diisocyanate, (2) a polyol component, and (3) a chain extender component comprising an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine; resulting in a TPU composition that is resistant to chemical degradation and stains. The components of the TPU composition should be understood to include all of the element described in the various embodiments herein.

The process to produce the TPU polymer of this invention can utilize conventional and hereafter developed TPU manufacturing equipment and known or hereafter developed processes. The three reactants (the isocyanate component, the polyether polyol, and the chain extender component) are reacted together to form the TPU useful in this invention.

In one embodiment, the process is a so-called "one-shot" process where all three reactants are added to an extruder reactor and reacted. The equivalent weight amount of the diisocyanate to the total equivalent weight amount of the hydroxyl containing components, that is, the polyether polyol intermediate and the chain extender component, can be from about 0.95 to about 1.10, or from about 0.96 to about 1.03, and even from about 0.97 to about 1.05. An optional urethane catalyst may be used in the reaction in some embodiments.

The TPU of the present invention can also be prepared utilizing a pre-polymer process. In the pre-polymer route, polyol intermediates are reacted with generally an equivalent excess of one or more diisocyanates to form a pre-polymer solution having free or unreacted diisocyanate therein. An optional urethane catalyst may be use in the reaction in some embodiments. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.03 and even from about 0.97 to about 1.05. The chain extension reaction temperature is generally from about 100° C. to about 250° C. or from about 200° C. to about 250° C. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the polyisocyanate component comprising hexamethylene-1,6-diisocyanate, the polyol component, and the chain extender component comprising an alkylene substituted spirocyclic compound are mixed on a single or twin screw extruder with multiple heat zones and multiple feed ports between its feed end and its die end. The ingredients may be added at one or more of the feed ports and the resulting TPU composition that exits the die end of the extruder may be pelletized.

In another embodiment, the polyisocyanate component comprising hexamethylene-1,6-diisocyanate, the polyol component, and the chain extender component comprising an alkylene substituted spirocyclic compound as disclosed herein are generally added together and reacted in accordance with standard polyurethane synthesis methodology as described herein. The TPU forming components of the present invention can be melt polymerized in a suitable mixer, such as an internal mixer known as a Banbury mixer, or in an extruder. Suitable processing or polymerization temperatures are from about 100° C. to about 250° C. in one aspect, and from about 200° C. to about 250° C. in another aspect.

Optionally, it may be desirable to utilize catalysts such as stannous and other metal carboxylates as well as tertiary amines. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

The TPU polymers of the present invention can be mixed with various conventional additives or compounding agents that are known in the art or hereafter developed, such as antioxidants, biocides, fungicides, antimicrobial agents, anti-static additives, plasticizers, fillers, extenders, flame retardants, impact modifiers, pigments, lubricants, mold release agents, rheology modifiers, UV absorbers, and the like. The level of conventional additives will depend on the final properties and cost of the desired end-use application, as is well known to those skilled in the art of compounding TPUs. These additional additives can be incorporated into the components of, or into the reaction mixture for the preparation of the TPU, or after making the TPU. In another process, all the materials can be mixed with the TPU and then melted or they can be incorporated directly into the melt of the TPU composition.

In another aspect, the present invention refers to an article comprising the TPU of the present invention as described in detail herein. Articles comprising the TPU of the present invention may be any molded articles, such as injection molded articles. In one embodiment, such TPU can be used to make articles where it is desirable to have a transparent finish. In still other embodiments, the articles containing the various composition described above include any article that may be exposed to chemicals or staining agents, such as inks, during use, and especially such articles which have not been made using thermoplastic polyurethanes in the past because of such materials having insufficient resistance to chemical degredation or stains. Articles and applications where this composition may be useful include, but are not limited to protective films, decorative films, graphic films, labels, flooring, multi-layer film constructions, consumer products, electronics, fiber composites, or protective or decorative coating (e.g. varnish) alternatives. The specific applications where the benefits of the TPU composition of the present invention can be applied are varied and numerous and include, by way of example only, paint protection films, glass protection films for interior and exterior use, protection films on suitcases, lens protection, anti-graffiti protection on signs or other surfaces, wear layers on flooring, automotive parts including interior and exterior surfaces, protective covers for electronic devices, screen protection, as well as fiber composites for auto, aerospace, wind-energy, and pressure vessel applications. Indeed, the TPU composition of the present invention may be useful in any application that one skilled in the art would find a transparent, thermoplastic material having stain resistance either now known or later discovered.

The compositions of the invention or any blends thereof may be used to prepare the molded products of this invention in any molding process. The molding processes are well known to those of ordinary skill in the art and include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

In another aspect, the present invention refers to a method of increasing the chemical and stain resistance of an article, by making an article comprising an effective amount of a thermoplastic polyurethane (TPU) wherein the TPU comprises the reaction product of (1) an aliphatic polyisocyanate, comprising, or consisting essentially of, or consisting of hexamethylene-1,6-diisocyanate, (2) a polyol component as described herein, and (3) chain extender component, comprising, consisting essentially of, or consisting of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine.

The present technology also includes the use of a thermoplastic polyurethane composition wherein the TPU comprises the reaction product of (1) a polyisocyanate component comprising, or consisting essentially of, or consisting of hexamethylene-1,6-diisocyanate, (2) a polyol component as described herein, and (3) a chain extender component, comprising, or consisting essentially of, or consisting of an alkylene substituted spirocyclic compound comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine to increase the chemical and stain resistance of an article. The use may also make the article transparent.

Various preferred features and embodiments will be described below by way of non-limiting illustration.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about". It is to be understood that the upper and lower amount, range, and ratio limits set forth herein may be independently combined. Similarly, the ranges and amounts for each element of the invention can be used together with ranges or amounts for any of the other elements.

EXAMPLES

In these examples, the TPUs are synthesized from the components set forth in Table 1. In table 1, SPG refers to a alkylene substituted spirocyclic compound comprising:

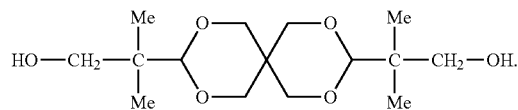

PTMEG is a polytetramethylene glycol polyether polyol, PEBA is a polyethylene butylene adipate, CAPA is a polycaprolactone polyol, BDO is 1,4-butanediol, HDO is 1,6-hexanediol, DPG is dipropylene glycol, BEPD is 2-butyl-2-ethyl-1,3-propanediol, NPG is neopentylglycol, HDI is hexamethylene-1,6-diisocyanate, MDI is 4,4'-methylenebis (phenyl isocyanate), and H12MDI is dicyclohexylmethane-4,4'-diisocyanate.

TABLE 1

| Example | Polyol | Chain Extender/Co-Chain Extender | Isocyanate | Wt. % Hard Segment |
|---|---|---|---|---|
| Inv. A | PTMEG | SPG | HDI | 70.0 |
| Inv. B | PTMEG | SPG | HDI | 60.0 |
| Inv. C | PEBA | SPG | HDI | 79.0 |

TABLE 1-continued

| Example | Polyol | Chain Extender/Co-Chain Extender | Isocyanate | Wt. % Hard Segment |
|---|---|---|---|---|
| Inv. D | CAPA | SPG | HDI | 73.0 |
| Comp. 1 | PTMEG | SPG/10% BDO | HDI | 61.5 |
| Comp. 2 | PTMEG | SPG/10% HDO | HDI | 61.7 |
| Comp. 3 | PTMEG | SPG/10% DPG | HDI | 61.7 |
| Comp. 4 | PTMEG | SPG/10% BEPD | HDI | 61.9 |
| Comp. 5 | PTMEG | SPG/10% NPG | HDI | 61.6 |
| Comp. 6 | PTMEG | SPG | HDI/5% H12MDI | 60.9 |
| Comp. 7 | PTMEG | SPG | HDI/10% MDI | 76.5 |
| Comp. 8 | PTMEG | SPG | H12MDI | 60.2 |
| Comp. 9 | PTMEG | SPG | MDI | 60.0 |
| Comp. 10 | PTMEG | BDO | HDI | 70.5 |
| Comp. 11 | PTMEG | HDO | HDI | 70.2 |
| Comp. 12 | CAPA | BDO | H12MDI | 65.0 |
| Comp. 13 | PTMEG | SPG | HDI | 50.0 |

The TPUs of Table 1 were evaluated to determine Haze according to ASTM D1003-11 (measured using a Haze-gard Plus from BYK), Permanent Marker Staining according to ASTM D6578M-13, and Chemical Resistance according to EN 438-2. In the Permanent Marker Test, ASTM D6578M-13 was followed except that the ΔE (color change of the material measured using a Colorflex Hunterlab A60-1010-615 colorimeter) was measured after 5 days instead of the 24 hours specified in the test method and a red solvent based permanent ink marker was used instead of a blue solvent based permanent ink marker as specified in the test. The Chemical Resistance results are reported using a visual rating scale of 0 (destroyed surface) to 5 (no damage) according to the standard specified by the test method. The results of the testing are summarized in Table 2.

TABLE 2

| Example | Hardness Shore D | Haze (%) | Permanent Marker (ΔE) | Chemical Resistance (Average Visual Rating) |
|---|---|---|---|---|
| Inv. A | 71.7 | 8 | 9.6 | 5 |
| Inv. B | 60 | 12 | 17 | 5 |
| Inv. C | 79.3 | 12 | 28 | 5 |
| Inv. D | 73.2 | 12 | 31 | 5 |
| Comp. 1 | 64.5 | 14 | 46 | 4.6 |
| Comp. 2 | 62.2 | 11 | 80 | 4.6 |
| Comp. 3 | 60.6 | 13 | 53 | 4.6 |
| Comp. 4 | 59.4 | 12 | 61 | 4.6 |
| Comp. 5 | 60.4 | 11 | 57 | 4.6 |
| Comp. 6 | 60.4 | 19 | 62 | 4.4 |
| Comp. 7 | 74 | 69 | 37 | 5 |
| Comp. 8 | 81.1 | 8 | 30 | 4.2 |
| Comp. 9 | 80 | 26 | 46 | 4.6 |
| Comp. 10 | 62.4 | 57 | 30 | 5 |
| Comp. 11 | 56.1 | 79 | 48 | 5 |
| Comp. 12 | 65 | 4 | 63 | 4.4 |
| Comp. 13 | 50 | 15 | 60 | 5 |

A shown above, TPU compositions made according to the present invention provide transparency with a combination of both stain resistance, as represented by the haze measurement, permanent marker test, and resistance to chemical degradation test.

All molecular weight values provided herein are weight average molecular weights unless otherwise noted. All molecular weight values have been determined by GPC analysis unless otherwise noted.

As used herein, the transitional term "comprising", which is synonymous with "including", "containing", or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A thermoplastic polyurethane composition comprising the reaction product of (1) an polyisocyanate component, wherein the polyisocyanate component comprises at least 90 mol % hexamethylene-1,6-diisocyanate, (2) a polyol component consisting of poly(tetramethylene ether) glycol; and (3) a chain extender component, wherein the chain extender component comprises at least 90 mol % alkylene substituted spirocyclic compound comprising an alkylene substituted saturated spirocyclic-diol, an alkylene substituted saturated spirocyclic-diamine, or a combination thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

2. The thermoplastic polyurethane composition of claim 1, wherein the alkylene substituted spirocyclic compound is a spiroheterocycle containing 2 heteroatoms in each ring, where the heteroatoms are oxygen, nitrogen, sulfur or phosphorous.

3. The thermoplastic polyurethane composition of claim 1, wherein the structural formula of the alkylene substituted spirocyclic compound is:

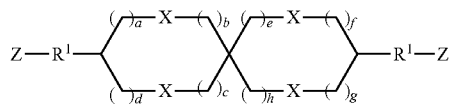

wherein each X is independently selected from 0, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3.

4. The thermoplastic polyurethane composition of claim 3, wherein a is equal to g, b is equal to h, c is equal to e and d is equal to f.

5. The thermoplastic polyurethane composition of claim 3, wherein the alkylene substituted spirocyclic compound contains two 6 membered ring, X is O, R1 is 1,1 dimethylethyl, Z is —OH, and where either (i) a is 0, b is 1, c is 1, d is 0, e is 1, f is 0, g is 0 and h is 1 or (ii) a is 1, b is 0, c is 0, d is 1, e is 0, f is 1,g is 1 and h is 0.

6. The thermoplastic polyurethane composition of claim 1, wherein the structural formula of the alkylene substituted spirocyclic compound is:

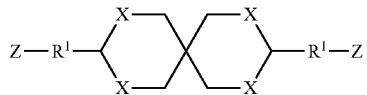

wherein each X is selected from 0, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms.

7. The thermoplastic polyurethane composition of claim 6, wherein X is 0, R1 is 1,1 dimethylethyl, and Z is —OH.

8. The thermoplastic polyurethane composition of claim 1, wherein the thermoplastic polyurethane composition comprises at least 60% by weight hard segment.

9. A method of increasing the chemical and stain resistance of an article, comprising molding an article using the thermoplastic polyurethane composition of claim 1.

10. A thermoplastic polyurethane composition comprising the reaction product of (1) an polyisocyanate component, wherein the polyisocyanate component comprises at least 90 mol % hexamethylene-1,6-diisocyanate, (2) a polyol component consisting of polyethylene butylene adipate; and (3) a chain extender component, wherein the chain extender component comprises at least 90 mol % alkylene substituted spirocyclic compound comprising an alkylene substituted saturated spirocyclic-diol, an alkylene substituted saturated spirocyclic-diamine, or a combination thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

11. The thermoplastic polyurethane composition of claim 10, wherein the alkylene substituted spirocyclic compound is a spiroheterocycle containing 2 heteroatoms in each ring, where the heteroatoms are oxygen, nitrogen, sulfur or phosphorous.

12. The thermoplastic polyurethane composition of claim 10, wherein the structural formula of the alkylene substituted spirocyclic compound is:

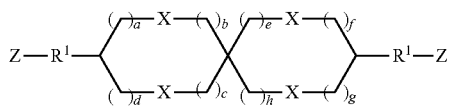

wherein each X is independently selected from 0, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3.

13. The thermoplastic polyurethane composition of claim 12, wherein a is equal to g, b is equal to h, c is equal to e and d is equal to f.

14. The thermoplastic polyurethane composition of claim 12, wherein the alkylene substituted spirocyclic compound contains two 6 membered ring, X is O, R1 is 1,1 dimethylethyl, Z is —OH, and where either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

15. The thermoplastic polyurethane composition of claim 10, wherein the structural formula of the alkylene substituted spirocyclic compound is:

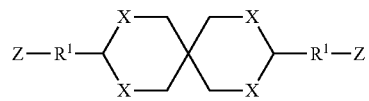

wherein each X is selected from 0, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms.

16. The thermoplastic polyurethane composition of claim 15, wherein X is 0, R1 is 1,1 dimethylethyl, and Z is —OH.

17. The thermoplastic polyurethane composition of claim 10, wherein the thermoplastic polyurethane composition comprises at least 60% by weight hard segment.

18. A method of increasing the chemical and stain resistance of an article, comprising molding an article using the thermoplastic polyurethane composition of claim 10.

19. A thermoplastic polyurethane composition comprising the reaction product of (1) an polyisocyanate component, wherein the polyisocyanate component comprises at least 90 mol % hexamethylene-1,6-diisocyanate, (2) a polyol component consisting of a copolymer of a polyether polyol and a polycaprolactone polyol; and (3) a chain extender component, wherein the chain extender component comprises at least 90 mol % alkylene substituted spirocyclic compound comprising an alkylene substituted saturated spirocyclic-diol, an alkylene substituted saturated spirocyclic-diamine, or a combination thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

20. The thermoplastic polyurethane composition of claim 19, wherein the alkylene substituted spirocyclic compound is a spiroheterocycle containing 2 heteroatoms in each ring, where the heteroatoms are oxygen, nitrogen, sulfur or phosphorous.

21. The thermoplastic polyurethane composition of claim 19, wherein the structural formula of the alkylene substituted spirocyclic compound is:

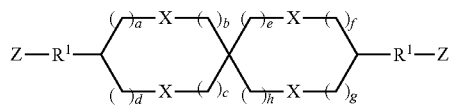

wherein each X is independently selected from O, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3.

22. The thermoplastic polyurethane composition of claim 21, wherein a is equal to g, b is equal to h, c is equal to e and d is equal to f.

23. The thermoplastic polyurethane composition of claim 21, wherein the alkylene substituted spirocyclic compound contains two 6 membered ring, X is O, R1 is 1,1 dimethylethyl, Z is —OH, and where either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

24. The thermoplastic polyurethane composition of claim 19, wherein the structural formula of the alkylene substituted spirocyclic compound is:

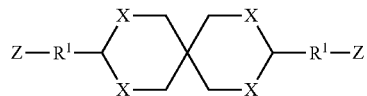

wherein each X is selected from O, CHR2, NR2, S, PR2, wherein each R2 represents a hydrogen atom or an alkyl group containing from 1 to about 6 carbon atoms, each R1 is an alkylene containing from 1 to 4 carbon atoms and each Z is selected from OH or NHR3 wherein R3 represents a hydrogen atom or an alkyl group containing from 1 to about 6 carbon atoms.

25. The thermoplastic polyurethane composition of claim 24, wherein X is O, R1 is 1,1 dimethylethyl, and Z is —OH.

26. The thermoplastic polyurethane composition of claim 19, wherein the thermoplastic polyurethane composition comprises at least 60% by weight hard segment.

27. A method of increasing the chemical and stain resistance of an article, comprising molding an article using the thermoplastic polyurethane composition of claim 19.

* * * * *